United States Patent
Cadima et al.

(10) Patent No.: US 10,036,555 B2
(45) Date of Patent: Jul. 31, 2018

(54) METHOD FOR CONTROLLING A GAS COOKING APPLIANCE

(71) Applicant: General Electric Company, Schenectady, NY (US)

(72) Inventors: Paul Bryan Cadima, Prospect, KY (US); Amelia Lear Hensley, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 271 days.

(21) Appl. No.: 14/722,353

(22) Filed: May 27, 2015

(65) Prior Publication Data

US 2016/0345767 A1    Dec. 1, 2016

(51) Int. Cl.
  *A47J 27/62* (2006.01)
  *F24C 3/12* (2006.01)
  *A23L 5/10* (2016.01)

(52) U.S. Cl.
  CPC ............... *F24C 3/122* (2013.01); *A23L 5/15* (2016.08); *F24C 3/128* (2013.01); *A23V 2002/00* (2013.01)

(58) Field of Classification Search
  CPC ....................................... F24C 3/122
  USPC ............................................ 126/19 R, 39 R
  See application file for complete search history.

(56) References Cited

U.S. PATENT DOCUMENTS

| 8,776,776 B2 * | 7/2014 | Todd | F24C 3/128 |
|  |  |  | 126/19 R |
| 2010/0193507 A1 * | 8/2010 | Zimmer | H05B 6/6485 |
|  |  |  | 219/681 |

* cited by examiner

*Primary Examiner* — Avinash Savani
*Assistant Examiner* — Aaron Heyamoto
(74) *Attorney, Agent, or Firm* — Dority & Manning, P.A.

(57) ABSTRACT

A method for controlling a gas cooking appliance may generally include preheating an oven cavity of the appliance to a pre-selected temperature and, after preheating the oven cavity, cycling the cooking appliance through a plurality of cooking cycles so as to activate lower and upper burners of the appliance in a manner that provides heating both below and above a food item contained within the oven cavity, wherein the cooking cycles include a plurality of bake cycles within each of which the lower burner is activated for a period of time and a plurality of broil cycles within each of which the upper burner is activated for a period of time. Moreover, a cumulative ratio of the broil cycles to the bake cycles across the various cooking cycles is less than 1.

15 Claims, 6 Drawing Sheets

|  | BAKE CYCLE TIME | BROIL CYCLE TIME | TOP/BOTTOM HEAT RATIO 102V (%) | TOP/BOTTOM HEAT RATIO 120V (%) | TOP/BOTTOM HEAT RATIO 132V (%) |
|---|---|---|---|---|---|
| CYCLE 1 | 200 | 80 | 25.0 | 33.3 | 35.1 |
| CYCLE 2 | 200 | 0 | 0.0 | 0.0 | 0.0 |
| CYCLE 3 | 200 | 0 | 0.0 | 0.0 | 0.0 |
| CYCLE 4 | 200 | 80 | 25.0 | 33.3 | 35.1 |
| CYCLE 5 | 200 | 0 | 0.0 | 0.0 | 0.0 |
| CYCLE 6 | 200 | 0 | 0.0 | 0.0 | 0.0 |
| CYCLE 7 | 200 | 80 | 25.0 | 33.3 | 35.1 |
| CYCLE 8 | 200 | 0 | 0.0 | 0.0 | 0.0 |
| CYCLE 9 | 200 | 0 | 0.0 | 0.0 | 0.0 |
| CYCLE 10 | 200 | 80 | 25.0 | 33.3 | 35.1 |
|  |  | CUMMULATIVE RATIO | 10.0 | 13.3 | 14.1 |

|  | BAKE CYCLE TIME | BROIL CYCLE TIME | TOP/BOTTOM HEAT RATIO 102V (%) | TOP/BOTTOM HEAT RATIO 120V (%) | TOP/BOTTOM HEAT RATIO 132V (%) |
|---|---|---|---|---|---|
| CYCLE 1 | 200 | 40 | 0.0 | 11.1 | 13.5 |
| CYCLE 2 | 200 | 40 | 0.0 | 11.1 | 13.5 |
| CYCLE 3 | 200 | 40 | 0.0 | 11.1 | 13.5 |
| CYCLE 4 | 200 | 40 | 0.0 | 11.1 | 13.5 |
| CYCLE 5 | 200 | 40 | 0.0 | 11.1 | 13.5 |
| CYCLE 6 | 200 | 40 | 0.0 | 11.1 | 13.5 |
| CYCLE 7 | 200 | 40 | 0.0 | 11.1 | 13.5 |
| CYCLE 8 | 200 | 40 | 0.0 | 11.1 | 13.5 |
| CYCLE 9 | 200 | 40 | 0.0 | 11.1 | 13.5 |
| CYCLE 10 | 200 | 40 | 0.0 | 11.1 | 13.5 |
|  | | CUMMULATIVE RATIO | 0.0 | 11.1 | 13.5 |

FIG. -1-

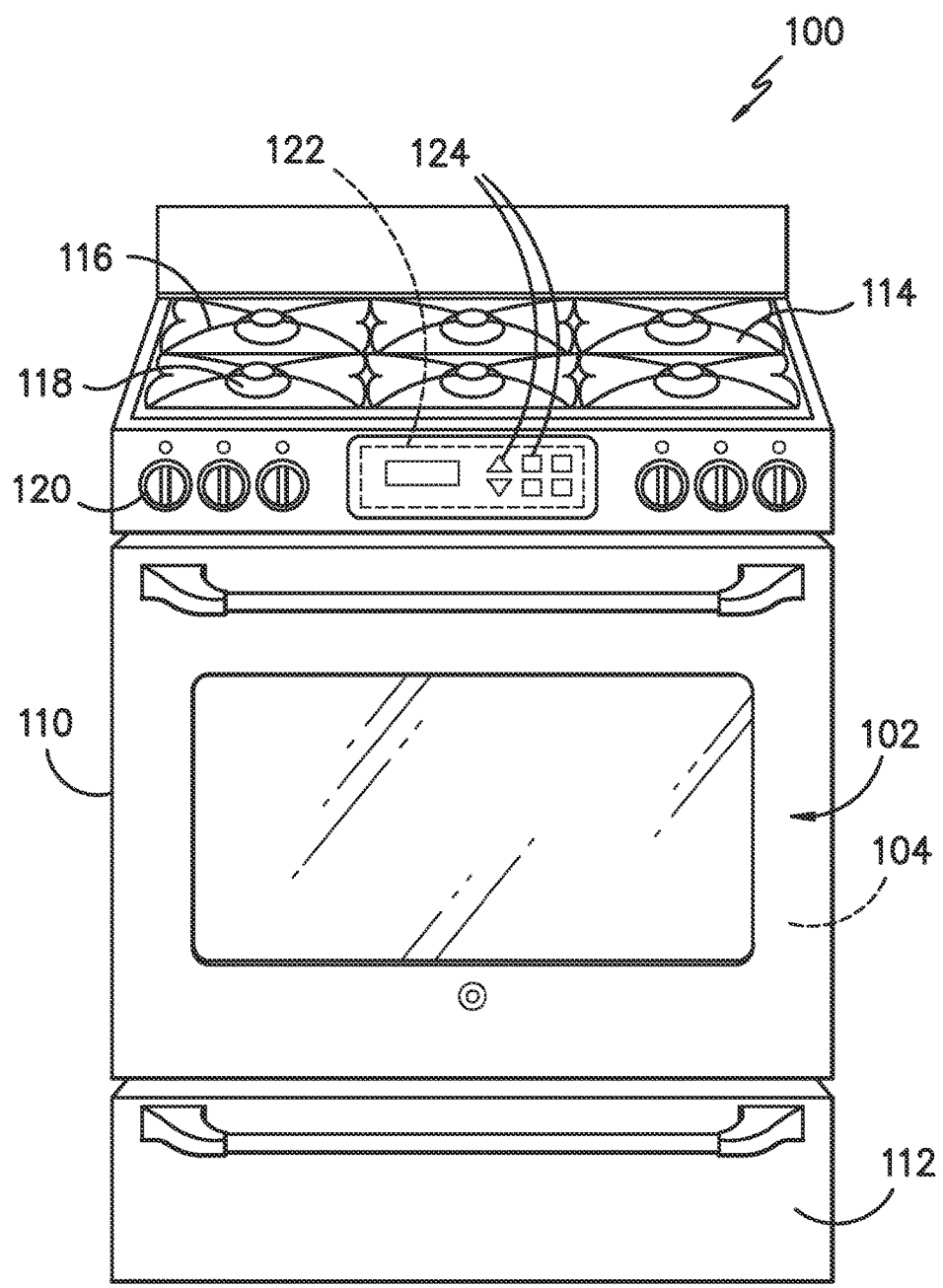
FIG. -2-

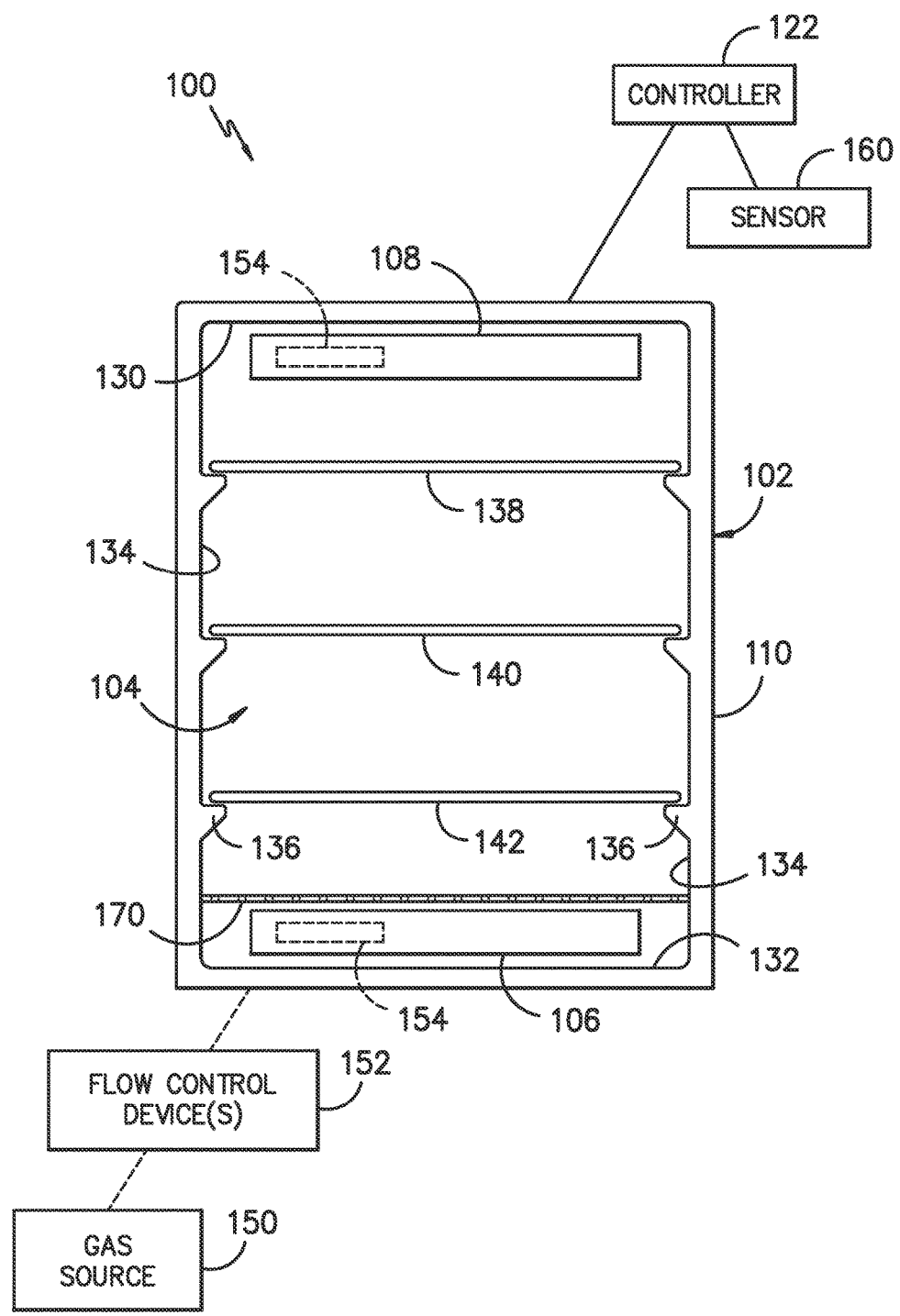
FIG. -3-

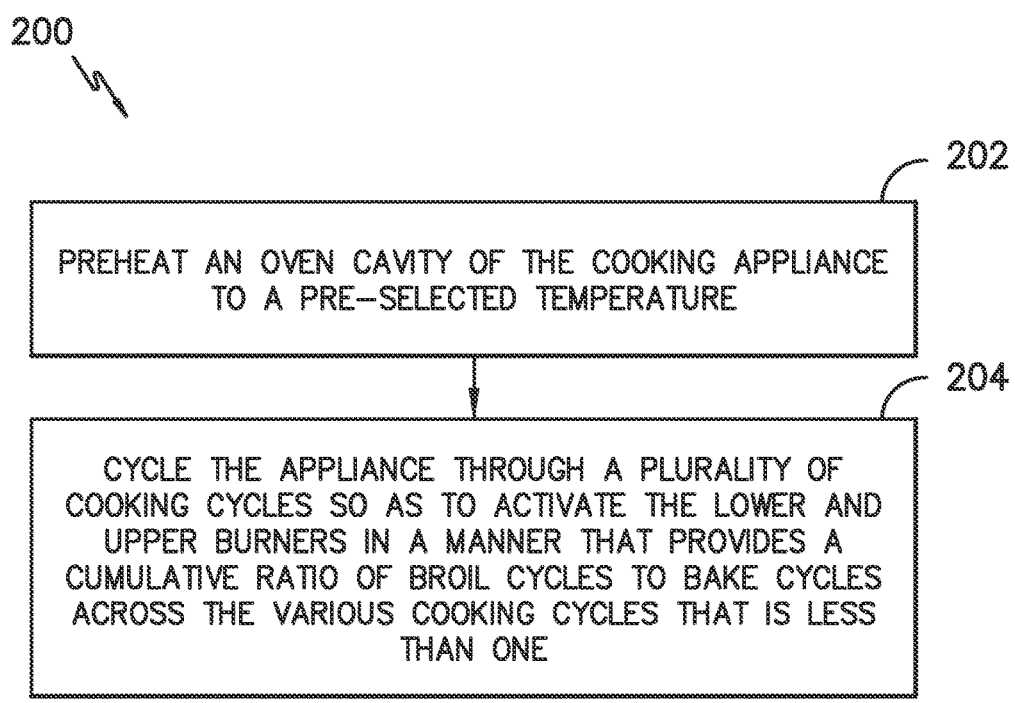
FIG. -4-

|  | BAKE CYCLE TIME | BROIL CYCLE TIME | TOP/BOTTOM HEAT RATIO 102V (%) | TOP/BOTTOM HEAT RATIO 120V (%) | TOP/BOTTOM HEAT RATIO 132V (%) |
|---|---|---|---|---|---|
| CYCLE 1 | 200 | 60 | 12.5 | 22.2 | 24.3 |
| CYCLE 2 | 200 | 0 | 0.0 | 0.0 | 0.0 |
| CYCLE 3 | 200 | 60 | 12.5 | 22.2 | 24.3 |
| CYCLE 4 | 200 | 0 | 0.0 | 0.0 | 0.0 |
| CYCLE 5 | 200 | 60 | 12.5 | 22.2 | 24.3 |
| CYCLE 6 | 200 | 0 | 0.0 | 0.0 | 0.0 |
| CYCLE 7 | 200 | 60 | 12.5 | 22.2 | 24.3 |
| CYCLE 8 | 200 | 0 | 0.0 | 0.0 | 0.0 |
| CYCLE 9 | 200 | 60 | 12.5 | 22.2 | 24.3 |
| CYCLE 10 | 200 | 0 | 0.0 | 0.0 | 0.0 |
| CUMMULATIVE RATIO | | | 6.3 | 11.1 | 12.2 |

FIG. —5—

| | BAKE CYCLE TIME | BROIL CYCLE TIME | TOP/BOTTOM HEAT RATIO 102V (%) | TOP/BOTTOM HEAT RATIO 120V (%) | TOP/BOTTOM HEAT RATIO 132V (%) |
|---|---|---|---|---|---|
| CYCLE 1 | 200 | 80 | 25.0 | 33.3 | 35.1 |
| CYCLE 2 | 200 | 0 | 0.0 | 0.0 | 0.0 |
| CYCLE 3 | 200 | 0 | 0.0 | 0.0 | 0.0 |
| CYCLE 4 | 200 | 80 | 25.0 | 33.3 | 35.1 |
| CYCLE 5 | 200 | 0 | 0.0 | 0.0 | 0.0 |
| CYCLE 6 | 200 | 0 | 0.0 | 0.0 | 0.0 |
| CYCLE 7 | 200 | 80 | 25.0 | 33.3 | 35.1 |
| CYCLE 8 | 200 | 0 | 0.0 | 0.0 | 0.0 |
| CYCLE 9 | 200 | 0 | 0.0 | 0.0 | 0.0 |
| CYCLE 10 | 200 | 80 | 25.0 | 33.3 | 35.1 |
| CUMMULATIVE RATIO | | | 10.0 | 13.3 | 14.1 |

FIG. −6−

METHOD FOR CONTROLLING A GAS COOKING APPLIANCE

FIELD OF THE INVENTION

The present subject matter relates generally to gas cooking appliances and, more particularly, to an improved method for controlling a gas cooking appliance to allow for more consistent top-to-bottom heating within an oven of the appliance across a wide range of potential input voltages that may be supplied to the oven's burner igniters.

BACKGROUND OF THE INVENTION

Gas cooking appliances, such as gas ranges, often include two or more heat sources or burners for heating a food item contained within an oven cavity of the cooking appliance. For instance, a lower (or bake) burner is often provided at a location adjacent to a bottom surface of the oven cavity for providing heating below the food item contained within the cavity. Additionally, an upper (or broil) burner is often provided at a location adjacent to a top surface of the oven cavity for providing heating above the food item contained within the cavity.

In a typical gas oven appliance, an electronic ignition system is often used to ignite the gas supplied to each burner. For instance, a hot surface or "glow bar" type igniter or system is commonly used to ignite the gas. In such systems, the igniter and gas valve circuit are connected in series. As current flows through the igniter, the igniter heats up. When the igniter reaches a predetermined ignition temperature, the gas valve will open, allowing gas to flow to the respective burner. The glowing hot igniter then ignites the gas flow.

However, if the input power or voltage to the igniter varies or fluctuates, as is common with household electric power supplies, the time required for the igniter to reach the predetermined ignition temperature will vary. For instance, in a typical situation, nominal 120V supply voltages can vary by as much as +10% and −15%. Consequently, it can take on average between 10-50 seconds for the oven igniter to reach the predetermined ignition temperature, open the gas valve and ignite the gas at the oven burner. Such voltage-dependent ignition times introduce significant uncertainty for controlling the heating within a gas oven appliance.

Certain gas oven cooking algorithms typically rely upon timed ON and OFF cooking algorithms, commonly referred to as bake and broil cycles. Specifically, these conventional cooking algorithms providing alternating bake/broil cycles in which the lower (or bake) burner is activated for a predetermined amount of time and, following the expiration of such time period, the upper (or broil) burner is then activated for a predetermined amount of time. The cooking algorithm continuously repeats these on/off cycles such that activation of the burners continuously alternates between the lower burner and the upper burner. However, these timed cooking algorithms are susceptible to inconsistent cooking performance due to the variable input voltages supplied to the ignition system of the appliance. For instance, if the time needed for the igniter to reach the predetermined ignition temperature is longer than anticipated by the timed cooking cycle, the actual cooking time may be adversely impacted.

This is particularly true for the timed broil cycles, which are typically significantly shorter than their corresponding timed bake cycles. For instance, FIG. 1 provides a data table illustrating an example of a conventional cooking algorithm that utilizes alternating timed bake/broil cycles. As shown, the table provides data for ten consecutively ordered cooking cycles, with each cooking cycle including separate bake and broil cycles. Specifically, during the first cooking cycle, the lower burner may be activated for a predetermined period of time (e.g., 200 seconds) and then turned off. The upper burner may then be activated for a predetermined period of time (e.g., 40 seconds) and then turned off to complete the first cooking cycle. Such alternating bake/broil cycles are then repeated (e.g., through cooking cycles 2-10) until the oven reaches the desired temperature.

As shown in FIG. 1, a significant variation in the top-to-bottom heat ratio occurs across the range of input voltages that may be supplied to the igniter associated with the upper (or broil) burner, which may substantially impact the oven's ability to provide even cooking along the top and bottom sides of any food items contained therein. Specifically, for an average input voltage of 120V, the oven achieves a given top-to-bottom heat ratio (e.g., 11.1%), which may, for instance, correspond to the desired top-to-bottom heat ratio for the oven. However, for an average input voltage of 132V, the oven achieves a higher top-to-bottom heat ratio (e.g., 13.5%), which may provide more top-side heating than is desired. Such an increased ratio may result from the igniter heating up to its ignition temperature more quickly due to the increased input voltage, thereby allowing for the upper burner to be ignited or turned on for a longer period of time. Moreover, as shown in FIG. 1, for an average input voltage of 102V, the oven achieves a top-to-bottom heat ratio of zero. Specifically, at such a low average input voltage, the igniter is not capable of heating up to its ignition temperature within the allotted time period for each broil cycle (e.g., 40 seconds). As a result, even though it is intended for the upper burner to be turned on for a period of time during each cooking cycle, such burner is never actually turned on, thereby leading to inconsistent or unbalanced top-to-bottom cooking within the oven.

Accordingly, an improved method for controlling a gas cooking appliance that allows for a more consistent top-to-bottom cooking performance to be provided across a wide range of input voltages to the burner igniters would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a gas cooking appliance, wherein the gas cooking appliance includes an oven cavity and lower and upper burners disposed within the oven cavity. The method may generally include preheating the oven cavity to a pre-selected temperature and, after preheating the oven cavity, cycling the cooking appliance through a plurality of cooking cycles so as to activate the lower and upper burners in a manner that provides heating both below and above a food item contained within the oven cavity, wherein the cooking cycles include a plurality of bake cycles within each of which the lower burner is activated for a period of time and a plurality of broil cycles within each of which the upper burner is activated for a period of time. Moreover, a cumulative ratio of the broil cycles to the bake cycles across the various cooking cycles is less than 1.

In another aspect, the present subject matter is directed to a gas cooking appliance. The appliance may generally include an oven cavity for cooking a food item, a lower burner disposed adjacent to a bottom surface of the oven cavity and an upper burner disposed adjacent to a top surface of the oven cavity. In addition, the appliance may include a controller configured to preheat the oven cavity to a preselected temperature and, after preheating the oven cavity, cycle the cooking appliance through a plurality of cooking cycles so as to activate the lower and upper burners in a manner that provides heating both below and above the food item contained within the oven cavity, wherein the cooking cycles include a plurality of bake cycles within each of which the lower burner is activated for a period of time and a plurality of broil cycles within each of which the upper burner is activated for a period of time. Moreover, a cumulative ratio of the broil cycles to the bake cycles across the various cooking cycles is less than 1.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a data table providing an example of a conventional cooking algorithm that utilizes alternating bake and broil cycles;

FIG. 2 illustrates a front view of one embodiment of a gas cooking appliance in accordance with aspects of the present subject matter;

FIG. 3 illustrates a schematic view of various components that may be included within and/or associated with the cooking appliance shown in FIG. 2;

FIG. 4 illustrates a flow diagram of one embodiment of a method for controlling a gas cooking appliance in accordance with aspects of the present subject matter;

FIG. 5 illustrates a data table providing one example of a cooking algorithm that may be utilized in accordance with aspects of the present subject matter; and FIG. 6 illustrates a data table providing another example of a cooking algorithm that may be utilized in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved method for controlling the operation of a gas cooking appliance. Specifically, in several embodiments, the disclosed method relates to a cooking algorithm for controlling a gas oven appliance that uses a hot surface ignition device(s) to ignite at least the upper (or broil) burner of the gas oven. As will be described below, the cooking algorithm may include a plurality of cooking cycles across which a lesser number of broil cycles (i.e., cycles in which the upper burner is activated) are utilized as compared to bake cycles ((i.e., cycles in which the lower (or bake) burner is activated). For instance, in one embodiment, a broil cycle may be implemented within every other cooking cycle. By reducing the frequency at which the broil cycles are implemented, the total "broil" or cooking time that the upper burner is activated for any given broil cycle must be lengthened proportionally. As a result, the ratio of the amount of time along which the upper burner is actually ignited to the amount of time required for the igniter to heat up to the proper ignition temperature may be reduced, thereby reducing the effects of variations in the input voltage supplied to the igniter. Accordingly, a more consistent top-to-bottom heat ratio may be provided across the range of potential input voltages that may be supplied to the oven's igniters.

It should be appreciated that, unless otherwise indicated, the time associated with a given bake cycle or a given broil cycle will be described herein as including both the time required to heat-up the corresponding burner's igniter to the proper ignition temperature (i.e., pre-ignition time) as well as the time that the burner is actually ignited (i.e., post-ignition time). Thus, for example, the time associated with a broil cycle may extend from the moment the broil cycle is activated or otherwise initiated by the controller of the cooking appliance (e.g., when voltage to the igniter associated with the upper burner is initially turned on) to the moment that the upper burner is turned off (e.g., when the voltage to the igniter is cut-off).

Referring now to the drawings, FIGS. 2 and 3 illustrate one embodiment of a gas cooking appliance 100 in accordance with aspects of the present subject matter. Specifically, FIG. 2 illustrates a front view of the gas cooking appliance 100. Additionally, FIG. 3 illustrates a schematic view of various components that may be included within and/or associated with the cooking appliance 100 shown in FIG. 2.

In general, the gas cooking appliance 100 may correspond to any suitable cooking appliance that is gas-operated or that otherwise utilizes a supply of gas to provide heating. In the examples described herein, the cooking appliance 100 is configured as a free standing gas range. However, it should be appreciated that, while various embodiments of the present subject matter are described herein with respect to a free standing range, aspects of the disclosed embodiments may also be applied to any suitable cooking appliance with or without a cooktop such as, for example, a wall oven unit or any other suitable gas cooking appliance.

As shown in the illustrated embodiment, the cooking appliance 100 includes an oven 102 defining an oven cavity 104 containing both a lower (or bake) burner 106 (FIG. 3) and an upper (or broil) burner 108 (FIG. 3). As will be described below, the lower and upper burners 106, 108 may be configured to be cycled (e.g. selectively turned on and off) for providing heating both above and below cooking items, such as food items, contained within the oven cavity 104. In doing so, the upper burner 108 may be cycled on and off less frequently than the lower burner 106. To account for such a reduced number of broil cycles, the time across which the upper burner 108 is activated for each broil cycle may be lengthened, thereby reducing the effect of variation in the input voltage supplied to the cooking appliance 100. As a result, a more consistent top-to-bottom heat ratio may be provided within the oven 120 despite any input voltage variations.

As particularly shown in FIG. 2, the gas cooking appliance 100 generally includes a frame or housing 110 defining various internal cavities. For instance, the housing 110 may define the oven cavity 104 of the oven 102 and/or a drawer/mini-oven 112 directly below the oven 102 for storing/heating items. Additionally, the gas cooking appliance 100 may include a cooktop 114 positioned directly above the oven 102. As shown in FIG. 2, the cooktop 114 may include one or more cooking grates 116 and respective burners 118 that are configured to be controlled in any suitable manner. For instance, in one embodiment, each of the burners 118 may be controlled via a respective control knob 120 that is configured to regulate, for example, an amount of gas provided to the burner 118.

Moreover, as shown in the illustrated embodiment, the cooking appliance 100 may also include a controller 122 for providing desired functionality for the cooking appliance 100. For instance, as will be described below, the controller 122 may be configured to control the activation and deactivation of the burners 106, 108 contained within the oven cavity 104 of the oven 102. For instance, by controlling the operation of the burners 106, 108, the controller 122 may be configured to control the various operating modes of the oven 120, such as baking, convection baking, roasting, broiling, cleaning and/or any other suitable operations.

It should be appreciated that the controller 122 may generally comprise any suitable processor-based device known in the art. Thus, in several embodiments, the controller 122 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory of the controller 122 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store suitable computer-readable instructions that, when implemented by the processor(s), configure the controller 122 to perform various computer-implemented functions, such as by implementing embodiments of the cooking algorithm disclosed herein. In addition, the controller 122 may also include various other suitable components, such as a communications circuit or module, one or more input/output channels, a data/control bus and/or the like.

Additionally, as shown in FIG. 2, the cooking appliance 100 may also include one or more user-interface elements 124 (e.g., buttons, knobs, etc.) for receiving user inputs associated with controlling the operation of the oven 102. For instance, a user may utilize the user-interface elements 124 to input a desired oven temperature into the controller 122. The controller 122 may then control the operation of the oven 102 (e.g., by activating/deactivating one or more of the oven burners 106, 108) so as to increase the internal temperature within the oven cavity 104 to the user-selected temperature and/or to maintain the internal temperature at such user-selected temperature.

Moreover, in several embodiments, the controller 122 may be communicatively coupled to a temperature sensor 160 for monitoring the internal temperature within the oven cavity 104. Specifically, the temperature sensor 160 may be configured to transmit temperature measurements to the controller 122. The controller 122 may then control the operation of the burners 106, 108 based on the temperature measurements so as to heat the oven temperature up to and/or maintain such temperature at the user-selected temperature.

Referring particularly to FIG. 3, the oven cavity 104 for the oven 102 may generally include a top surface 130, a bottom surface 132 and a plurality of side surfaces 134 extending between the top and bottom surfaces 130, 132. As shown, the side surfaces 134 may include one or more sets of protrusions 136 or other suitable support members. The protrusions 136 may generally be configured so that oven racks 138, 140, 142 may be placed on the protrusions 136 for supporting items within the oven cavity 104.

Additionally, as indicated above, lower and upper burners 106, 108 may also be contained within the oven cavity 104. Specifically, as shown in FIG. 3, the lower (or bake) burner 106 may be disposed within the oven cavity 104 adjacent to its bottom surface 132 such that the lower burner 106 is configured to provide heating along the bottom side of any items supported on the oven racks 138, 140, 142. Similarly, the upper (or broil) burner 108 may be disposed within the oven cavity 104 adjacent to its top surface 130 such that the upper burner 108 is configured to provide heating along the top side of any items supported on the oven racks 138, 140, 142.

It should be appreciated that, in several embodiments, a vented divider 170 may be positioned within the oven cavity 104 directly above the lower burner 106. The vented divider 170 may generally form the bottom of the portion of the oven cavity 104 that is accessible to the user and may serve to isolate the flames of the lower burner 106 from the user and any food spills.

In accordance with aspects of the present subject matter, the lower and upper burners 106, 108 may correspond to gas burners. As such, the burners 106, 108 may be in fluid communication with a gas supply or source 150 for supplying gas to each burner 106, 108. Additionally, in several embodiments, the supply of gas to each burner 106, 108 may be controlled via one or more valves, solenoids, or other suitable flow control devices 152. In such embodiments, the operation of each flow control device 152 may be configured to be actively controlled (e.g., via the controller 122) or passively controlled (e.g., via interaction with an associated igniter).

It should be appreciated that, in several embodiments, the lower and upper burners 106, 108 may be configured to provide the same or substantially the same heat output. For instance, the lower and upper burners 106, 108 may have the same or a similar configuration such that, when gas is being supplied to each burner 106, 108, the burners 106, 108 will provide the same or substantially the same heat output over a given period of time. However, in alternative embodiments, the lower and upper burners 106, 108 may be configured to provide differing heat outputs. For instance, in one embodiment, the upper burner 108 may be configured to provide more heat output than the lower burner 106 (e.g., to allow for the oven 102 to be operated in a searing mode).

Moreover, each burner 106, 108 may include or be associated with an igniter 154 for igniting the gas supplied to the burner 106, 108. In several embodiments, each igniter 154 may correspond to a hot surface igniter (e.g., a glow bar igniter or similar hot surface igniter device) that is configured to be heated to a suitable temperature for igniting the gas supplied to its associated burner 106, 108. For instance, when activating one of the burners 106, 108, the controller 122 may be configured to turn on a supply of voltage to the corresponding igniter 154 so as to increase the temperature of the igniter 154. Once the igniter 154 is sufficiently heated, gas may be supplied to the burner 106, 108 (e.g., by opening the corresponding flow control device 152) and ignited by the igniter 154 to allow the burner 106, 108 to provide heating within the oven cavity 104.

In particular embodiments of the present subject matter, the igniter 154 for each burner 106, 18 may be coupled in series with its corresponding flow control device 152 to allow the flow control device 152 to be automatically opened/closed based on the electrical properties and/or temperature of the igniter 154. For instance, in one embodiment, each flow control device 152 may correspond to a bi-metal operated valve coupled in series to its corresponding igniter 154. In such an embodiment, when voltage is supplied to the igniter 154, the resistance of the igniter 154 may decrease as its temperature increases. As a result, the current flowing through the igniter 154 may increase with decreases in the resistance. Once the current passing through the igniter 154 to the bi-metal operated valve is sufficiently high, the valve may open, thereby allowing a flow of gas to be supplied to the corresponding burner 106, 108.

During operation of the oven 102, the controller 122 may be configured to initially control the activation of the burner(s) 106, 108 to allow the temperature within the oven cavity 104 to be increased to a predetermined or user-selected temperature (i.e., during a preheating mode of operation). For instance, the controller 122 may be configured to activate the lower burner 106 until the temperature within the oven cavity 104 reaches the user-selected temperature. At such point, the controller 122 may be configured to adjust its operational control of the lower and upper burners 106, 108 in a manner consistent with the control methodology or cooking algorithm described herein. For instance, as will be described below, the controller 122 may be configured to implement a plurality of cooking cycles (including both bake and broil cycles) so as to cycle the lower and upper burners 106, 108 in a manner that provides heating both below and above any item(s) contained within the oven cavity 104, thereby providing for substantially even browning or cooking of such item(s). In doing so, the number of broil cycles (i.e., the number of times the upper burner 108 is activated) may be reduced as compared to conventional cooking algorithms that utilize alternating bake/broil cycles while the time associated with each broil cycle may be increased to allow for a more consistent top-to-bottom heat ratio to be provided within the oven 102 across a wide range of input voltages supplied to the igniter(s) 154.

Referring now to FIG. 4, a flow diagram of one embodiment of a method 200 for controlling the operation of a gas cooking appliance is illustrated in accordance with aspects of the present subject matter. In general, the method will be described herein with reference to the cooking appliance 100 described above with reference to FIGS. 2 and 3. However, it should be appreciated by those of ordinary skill in the art that the disclosed method 100 may be implemented within any other suitable cooking appliance. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include initially preheating an oven cavity 104 of the cooking appliance 100 to a pre-selected temperature. For instance, as indicated above, the cooking appliance 100 may include suitable user-interface elements 124 (e.g., buttons, knobs, etc.) for allowing a user to select a desired temperature for the oven 102. Upon the selection a given oven temperature, the controller 122 may be configured to control the operation of one or more of the burners 106, 108 in order to increase the temperature within the oven cavity 104 to the user-selected temperature. For instance, the controller 122 may be configured to activate the lower burner 106 to allow the internal oven temperature to be increased to the user-selected temperature.

Additionally, at (204), after preheating the oven cavity 104, the method 200 may include cycling the cooking appliance 100 through a plurality of cooking cycles so as to activate the lower and upper burners 106, 108 of the appliance 100 in a manner that provides a cumulative ratio of broil cycles to bake cycles across the various cooking cycles that is equal to less than one. Specifically, as opposed to utilizing a conventional cooking algorithm that continuously alternates between bake and broil cycles, the cooking algorithm described herein provides for a reduced number of broil cycles to be implemented while increasing the cooking time associated with each broil cycle. Such increased cooking times for the broil cycles may allow for the gas cooking appliance 100 to accommodate the differing igniter heat-up times associated with variations in input voltage(s). As a result, the disclosed method 200 allows for more consistent top-to-bottom heating across a wide range of igniter input voltages.

For instance, FIG. 5 illustrates a data table providing one example of a cooking algorithm that may be implemented in accordance with aspects of the present subject matter. As shown, similar to the example described above with reference to FIG. 1, the table provides data for ten consecutively ordered cooking cycles. However, unlike the conventional cooking algorithm described above, each cooking cycle does not include separate bake and broil cycles. Rather, a broil cycle is only included within every other cooking cycle such that the cooking algorithm includes two bake cycles for every one broil cycle. Specifically, as shown in FIG. 5, during the first cooking cycle, the lower burner 106 may be activated for a predetermined period of time (e.g., 200 seconds) and then turned off. The upper burner 106 may then be activated for a predetermined period of time (e.g., 60 seconds) and then turned off to complete the first cooking cycle. Thereafter, during the second cooking cycle, the lower burner 106 may be activated for a predetermined period of time (e.g., 200 seconds) and then turned off to complete the second cooking cycle. The pattern of the first and second cooking cycles may then be repeated until the desired oven temperature is reached, or for the remainder of the cooking time (e.g., through cooking cycles 3-10), such that a broil cycle is only implemented within every other cooking cycle (e.g., only odd-number cooking cycles) whereas a bake cycle is implemented within every cooking cycle. Such a cooking algorithm provides for a cumulative ratio of broil cycles to bake cycles of 1:2.

As indicated above, given the reduced number of broil cycles, the cooking time associated with each broil cycle may be increased so as to provide the desired amount of top-side heating within the oven 102. For instance, in the illustrated embodiment, the cooking time associated with each broil cycle has been increased 50% to sixty seconds (as compared to the forty second broil cycles provided in the conventional cooking algorithm shown in FIG. 1) to account for the reduction in the total number of broil cycles.

As shown in FIG. 5, using the disclosed cooking algorithm, a more consistent top-to-bottom heat ratio may be provided as compared to the conventional cooking algorithm described above with reference to FIG. 1. Specifically, for an average input voltage of 120V, the oven 102 achieves the same cumulative top-to-bottom heat ratio as that shown in FIG. 1 for the conventional cooking algorithm (e.g., 11.1%). However, across the entire range of input voltages, the oven 102 achieves a much smaller, more consistent range of top-to-bottom heat ratios. For instance, as shown in FIG. 5, for the average high input voltage of 132V, the oven achieves a cumulative top-to-bottom heat ratio (e.g., 12.1%) that is significantly less than the corresponding cumulative top-to-bottom heat ratio for the conventional cooking algorithm shown in FIG. 1 (e.g., 13.5%). Similarly, for the average low input voltage of 102V, the oven 102 achieves a cumulative top-to-bottom heat ratio (e.g., 6.3%) that is significantly higher than the corresponding cumulative top-to-bottom heat ratio for the conventional cooking algorithm shown in FIG. 1 (e.g., 0%). As a result, an overall heat ratio variation of only 5.9% exists across the entire range of input voltages as compared to the 15.5% variation provided with the conventional cooking algorithm.

Referring now to FIG. 6, a data table illustrating another example of a cooking algorithm that may be implemented in accordance with aspects of the present subject matter. As shown, similar to the example described above with reference to FIG. 1, the table provides data for ten consecutively ordered cooking cycles. However, unlike the conventional cooking algorithm described above, each cooking cycle does not include separate bake and broil cycles. Rather, a broil cycle is only included within every third cooking cycle such that the cooking algorithm includes three bake cycles for every one broil cycle. Specifically, as shown in FIG. 6, during the first cooking cycle, the lower burner 106 may be activated for a predetermined period of time (e.g., 200 seconds) and then turned off. The upper burner 108 may then be activated for a predetermined period of time (e.g., 80 seconds) and then turned off to complete the first cooking cycle. Thereafter, during the second cooking cycle, the lower burner 106 may be activated for a predetermined period of time (e.g., 200 seconds) and then turned off to complete the second cooking cycle. Similarly, during the third cooking cycle, the lower burner 106 may be activated for a predetermined period of time (e.g., 200 seconds) and then turned off to complete the third cooking cycle. The pattern of the first, second and third cooking cycles may then be repeated the desired oven temperature is reached, or for the remainder of the cooking time (e.g., through cooking cycles 4-10), such that a broil cycle is only implemented within every third cooking cycle whereas a bake cycle is implemented within every cooking cycle. Such a cooking algorithm provides for a cumulative ratio of broil cycles to bake cycles of 1:3.

Similar to the example described above with reference to FIG. 5, given the reduced number of broil cycles, the cooking time associated with each broil cycle may be increased so as to provide the desired amount of top-side heating within the oven 102. For instance, in the illustrated embodiment, the cooking time associated with each broil cycle has been increased 100% to eighty seconds (as compared to the forty second broil cycles provided in the conventional cooking algorithm shown in FIG. 1) to account for the reduction in the total number of broil cycles.

As shown in FIG. 6, using the disclosed cooking algorithm, a significantly more consistent top-to-bottom heat ratio may be provided as compared to the conventional cooking algorithm described above with reference to FIG. 1. Specifically, across the entire range of input voltages, the oven 102 achieves a much smaller, more consistent range of top-to-bottom heat ratios. For instance, as shown in FIG. 6, for the average high input voltage of 132V, the oven achieves a cumulative top-to-bottom heat ratio of 14.1% and, for the average low input voltage of 102V, the oven 102 achieves a cumulative top-to-bottom heat ratio of 10.0%. As a result, an overall heat ratio variation of only 4.1% exists across the entire range of input voltages as compared to the 15.5% variation provided with the conventional cooking algorithm.

It should be appreciated that the embodiments of the cooking algorithms described above with reference to FIGS. 5 and 6 are simply provided as examples of suitable cooking algorithms that may be implemented in accordance with aspects of the present subject matter. Thus, one of ordinary skill in the art should readily understand that the disclosed cooking algorithms may be adjusted, as desired, to provide a different heating performance for the oven 102. Specifically, in alternative embodiments, the ratio of broil cycles to bake cycles may be further adjusted, as desired, to adjust the overall heat ratio variation that exists across the range of input voltages for the oven 102. For instance, in other embodiments, the cumulative ratio of broil cycles to bake cycles may be 1:4 or 1:5 or even lower. Similarly, the cooking times associated with each bake and/or broil cycle may also be varied, as desired, to adjust the heating performance of the oven 102. For instance, in one embodiment, the cooking time associated with each broil cycle shown in FIG. 5 and/or in FIG. 6 may be increased or decreased, as desired, to adjust the oven's heating performance.

Additionally, it should be appreciated that, although the examples shown in FIGS. 5 and 6 are described with reference to broil cycles being evenly spaced apart across the consecutively ordered cooking cycles in a repeating pattern (e.g., every other cooking cycle or every third cooking cycle), the broil cycles may, instead, be included within the cooking cycles in any other suitable manner that provides a cumulative ratio of broil to bake cycles that is less than one.

Moreover, one of ordinary skill in the art should also appreciate that additional factors may also be considered when selecting a particular ratio of broil to bake cycles to be used in accordance with aspects of the present subject matter. For instance, the reduction provided in the top-to-bottom heat ratio variation must be balanced against the impact that the increased time interval between broil cycles (and/or the increased cooking time associated with each broil cycle) may have on the overall cooking performance of the oven 102.

Further, it should be appreciated that the cooking algorithms described herein may be implemented in association with any suitable mode of operation for the disclosed cooking appliance 100. For instance, the cooking cycles shown in FIGS. 5 and 6 may be implemented during baking, convection baking, roasting and/or any other suitable mode of operation that utilizes the lower and upper burners 106, 108 for cooking.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a gas cooking appliance, the gas cooking appliance including an oven cavity and lower and upper burners disposed within the oven cavity, the method comprising:
   preheating the oven cavity to a pre-selected temperature; and
   after preheating the oven cavity, cycling the cooking appliance through a plurality of predetermined cooking cycles so as to activate the lower and upper burners in a manner that provides heating both below and above a food item contained within the oven cavity, wherein the plurality of predetermined cooking cycles includes a plurality of bake cycles within each of which the lower burner is activated for a period of time and then turned off and a plurality of broil cycles within each of which the upper burner is activated for a period of time and then turned off;
   wherein the plurality of predetermined cooking cycles corresponds to a plurality of consecutively ordered cooking cycles, one bake cycle of the plurality of bake cycles being included within each consecutively ordered cooking cycle and a broil cycle of the plurality of broil cycles being implemented no more than every other cooking cycle of the plurality of consecutively ordered cooking cycles such that a cumulative ratio of the plurality of broil cycles to the plurality of bake cycles across the plurality of predetermined cooking cycles is less than 1.

2. The method of claim 1, further comprising igniting a gas flow supplied to the upper burner during at least one of the plurality of broil cycles using a hot surface igniter.

3. The method of claim 2, wherein the hot surface igniter is coupled in series with a flow control device for controlling e gas flow to the upper burner.

4. The method of claim 1, wherein the cumulative ratio of the plurality of broil cycles to the plurality of bake cycles is about 1:2.

5. The method of claim 1, wherein the cumulative ratio of the plurality of broil cycles to the plurality of bake cycles is about 1:3.

6. The method of claim 1, wherein the plurality of broil cycles are included within the consecutively ordered cooking cycles in a repeating pattern.

7. The method of claim 1, wherein the lower burner is configured to provide substantially the same heat output as the upper burner.

8. The method of claim 1, wherein only one of the lower burner or the upper burner is activated at a time.

9. A gas cooking appliance, comprising:
   an oven cavity for cooking a food item, the oven cavity including a top surface and a bottom surface;
   a lower burner disposed adjacent to the bottom surface of the oven cavity;
   an upper burner disposed adjacent to the top surface of the oven cavity; and
   a controller configured to preheat the oven cavity to a pre-selected temperature and, after preheating the oven cavity, cycle the cooking appliance through a plurality of predetermined cooking cycles so as to activate the lower and upper burners in a manner that provides heating both below and above the food item contained within the oven cavity, wherein the plurality of predetermined cooking cycles includes a plurality of bake cycles within each of which the lower burner is activated for a period of time and then turned off and a plurality of broil cycles within each of which the upper burner is activated for a period of time and then turned off;
   wherein the plurality of predetermined cooking cycles corresponds to a plurality of consecutively ordered cooking cycles, one bake cycle of the plurality of bake cycles being included within each consecutively ordered cooking cycle and a broil cycle being implemented no more than every other cooking cycle of the plurality of consecutively ordered cooking cycles, such that a cumulative ratio of the plurality of broil cycles to the plurality of bake cycles across the plurality of predetermined cooking cycles is less than 1.

10. The gas cooking appliance of claim 9, further comprising a hot surface igniter provided in operative association with the upper burner.

11. The gas cooking appliance of claim 10, wherein the hot surface igniter is coupled in series with a flow control device for controlling a supply of gas to the upper burner.

12. The gas cooking appliance of claim 9, wherein the cumulative ratio of the plurality of broil cycles to the plurality of bake cycles is about 1:2.

13. The gas cooking appliance of claim 9, wherein the cumulative ratio of the plurality of broil cycles to the plurality of bake cycles is about 1:3.

14. The gas cooking appliance of claim 9, wherein the plurality of broil cycles are included within the consecutively ordered cooking cycles in a repeating pattern.

15. The gas cooking appliance of claim 9, wherein the lower burner is configured to provide substantially the same heat output as the upper burner.

* * * * *

UNITED STATES PATENT AND TRADEMARK OFFICE
CERTIFICATE OF CORRECTION

PATENT NO. : 10,036,555 B2
APPLICATION NO. : 14/722353
DATED : July 31, 2018
INVENTOR(S) : Paul Bryan Cadima et al.

It is certified that error appears in the above-identified patent and that said Letters Patent is hereby corrected as shown below:

In the Claims

Claim 3: In Column 11, Line 45 - "e gas" should read "the gas"

Signed and Sealed this
Eighteenth Day of December, 2018

Andrei Iancu
*Director of the United States Patent and Trademark Office*